US006338233B1

United States Patent
Georgitsis

(10) Patent No.: US 6,338,233 B1
(45) Date of Patent: Jan. 15, 2002

(54) PACKING MACHINE ASSEMBLY WITH INTEGRATED SWITCH CABINET UNITS

(75) Inventor: Nikolaos Georgitsis, Hamburg (DE)

(73) Assignee: Topack Verpackungstechnik GmbH (DE)

( * ) Notice: Subject to any disclaimer, the term of this patent is extended or adjusted under 35 U.S.C. 154(b) by 0 days.

(21) Appl. No.: 09/418,827

(22) Filed: Oct. 15, 1999

(30) Foreign Application Priority Data

Oct. 15, 1998 (DE) .......................................... 198 47 467

(51) Int. Cl.$^7$ .............................................. B65B 19/34
(52) U.S. Cl. .............................. 53/148; 53/236; 53/192; 312/119; 312/120
(58) Field of Search .......................... 53/148, 575, 149, 53/192, 236, 444, 234, 250, 137; 312/119, 201, 294, 295, 249, 120; 209/538; 27/701; 493/475, 478, 479; 361/142, 157

(56) References Cited

U.S. PATENT DOCUMENTS 3,895,479 A * 7/1975 Kastner ........................ 53/148
4,059,940 A * 11/1977 Menge et al. .................. 53/148
4,743,078 A * 5/1988 Dahnert ....................... 312/201
4,869,813 A * 9/1989 Bailey et al. ................ 209/538
4,969,305 A * 11/1990 York et al. ..................... 53/137
5,539,975 A * 7/1996 Kukuljan et al. ............. 27/701

FOREIGN PATENT DOCUMENTS

| CH | 673 552 | 3/1990 |
| DE | 88 17 242 | 10/1995 |
| DE | 0 844 178 A | 5/1998 |
| DE | 37 31 200 | 3/1999 |

* cited by examiner

Primary Examiner—Scott A. Smith
Assistant Examiner—Thanh Truong
(74) Attorney, Agent, or Firm—Venable; George H. Spencer; Robert Kinberg

(57) ABSTRACT

A packing machine is assembled with one or more control cabinets into a compact aggregate wherein a wall of each control cabinet constitutes at least a portion of the rear wall of the frame of the packing machine. Each control cabinet is movable (such as reciprocable or pivotable) relative to the machine to and from a position in which a portion of or the entire rear side of the machine frame is exposed to afford access to the interior of the machine.

13 Claims, 2 Drawing Sheets

PACKING MACHINE ASSEMBLY WITH INTEGRATED SWITCH CABINET UNITS

CROSS-REFERENCE TO RELATED CASES

This application claims the priority of German patent application Serial No. 198 47 467.9 filed Oct. 15, 1998. The disclosure of the German patent application, as well as that of each US and foreign patent and patent application mentioned in the specification of the present application, is incorporated herein by reference.

BACKGROUND OF THE INVENTION

The invention relates to improvements in aggregates of the type wherein one or more machines cooperate with one or more switch cabinet units (hereinafter called control cabinets or cabinets for short) for confinement of electrical, electronic and/or other equipment and/or components which are utilized to supply energy to, to monitor the operation of and/or to control the functioning of the machine or machines. Examples of such aggregates are those employing at least one packing machine and at least one integrated control cabinet or an analogous enclosure for the instruments cables, switches, circuits, valves, servomotors, computers and/or other components which initiate and evaluate the operation of the packing machine(s). Aggregates of such character can be utilized for the making of packets (e.g., those known as soft cup- or those known as hinge lid-packets for confinement of arrays of plain or filter cigarettes or other rod-shaped products of the tobacco processing industry.

A drawback of many presently known aggregates or assemblies of one or more producing and/or processing machines with one or more control cabinets is that they occupy a substantial amount of space, especially if all of their parts are to be readily accessible, or that it is necessary to complete an at least partial time-consuming dismantling if the aggregates are designed and assembled in a space-saving manner.

Another drawback of conventional aggregates of the above outlined character is that the machine(s) is or are quite noisy which is particularly undesirable if a large number of such aggregates are set up in a single hall or another building in a manner as is customary, for example, in the tobacco processing industry.

Still further, the appearance of a machine-control cabinet aggregate also constitutes a factor which warrants at least some consideration.

OBJECTS OF THE INVENTION

An object of the invention is to provide a compact machine-control cabinet aggregate wherein the interior of the machine or machines and/or one or more bard-to-reach parts of the control cabinet or cabinets are or can be caused to become readily accessible to the operators and/or other authorized persons.

Another object of the invention is to provide an aggregate which, if it includes one or more packing machines, is constructed and assembled in such a way that the interior of each packing machine is readily accessible if and whenever necessary.

A further object of the invention is to provide novel and improved movement-permitting connections between the constituents of an aggregate including a first unit having one or more producing and/or processing machines and a second unit having one or more control cabinets.

An additional object of the invention is to provide a novel and improved method of movably assembling the constituents of the above outlined aggregate in a space-saving manner and with a view to afford convenient access to each constituent of the aggregate.

Still another object of the invention is to provide a compact and eye-pleasing aggregate which can be utilized with advantage in tobacco processing plants and which is or can be designed to contribute to a reduction of noise or to the establishment of an acceptable noise level in actual use of the aggregate, either alone or jointly with relatively small or large numbers of additional aggregates and/or other machines or production lines.

A further object of the invention is to provide an aggregate constituting a combination of numerous features which, to the inventor's knowledge, were never combined in conventional assemblies of machines and control cabinets even though they contribute to facility of inspection and/or repair, simplicity, compactness, a reduction of noise level as well as to the eye-pleasing appearance of the aggregate.

Another object of the invention is to provide a novel and improved aggregate employing at least one cigarette packing machine.

An additional object of the invention is to provide a machine-control cabinet aggregate which can be readily assembled at the locale of intended use and which renders it possible to employ one or more bulky, heavy and/or otherwise hard-to-handle parts which are common to the machine or machines as well as to the associated control cabinet or cabinets.

Still another object of the invention is to provide an aggregate of the above outlined character wherein the housing(s) of the control cabinet(s) and the frame(s) of the machine(s) can share certain component parts, such as walls and/or the hardware which is used to movably and/or otherwise support the shared parts.

SUMMARY OF THE INVENTION

A feature of the invention resides in the provision of an aggregate which comprises a first unit including at least one energy-consuming machine having at least one internal space, and a second unit which includes at least one control cabinet having means for supplying energy to and for regulating the operation of the at least one machine. One of the first and second units comprises a wall (such as a plate-like partition) movable to and from a predetermined position in which the at least one internal space is at least partially separated from the at least one control cabinet.

The at least one machine can constitute a packing machine, e.g., a packing machine for rod-shaped products of the tobacco processing industry.

The wall can form part of the at least one control cabinet. For example, the at least one control cabinet can comprise a rear portion which includes the wall.

In accordance with a presently preferred embodiment, the at least one control cabinet is movable relative to the at least one machine and the wall can be connected with so that it shares the movements of the at least one control cabinet. For example, the at least one control cabinet can be mounted in such a way that it is reciprocable and/or pivotable relative to the at least one machine; if it is pivotable, it can be mounted for angular movement about an at least substantially vertical axis.

The arrangement can be such that the second unit of the improved aggregate comprises a plurality of control cabinets at the rear side of the at least one machine. Such control cabinets can include two cabinets which are at least substantial mirror images of each other.

At least one of the units, for example the first unit, can be substantially L-shaped or U-shaped.

Furthermore, at least one of the units (e.g., the second unit) can comprise one or more constituents which is or are parallelepipedon(s).

The height of one of the units can be a fraction of the height of the other unit. The same holds true for other dimensions of the first and second units.

The novel features which are considered as characteristic of the invention are set forth in particular in the appended claims. The improved aggregate itself, however, both as to its construction and the modes of assembling and manipulating the same, together with numerous additional important and advantageous features and attributes thereof, will be best understood upon perusal of the following detailed description of certain presently preferred specific embodiments with reference to the accompanying drawings.

DESCRIPTION OF PREFERRED EMBODIMENTS

Figure 1:
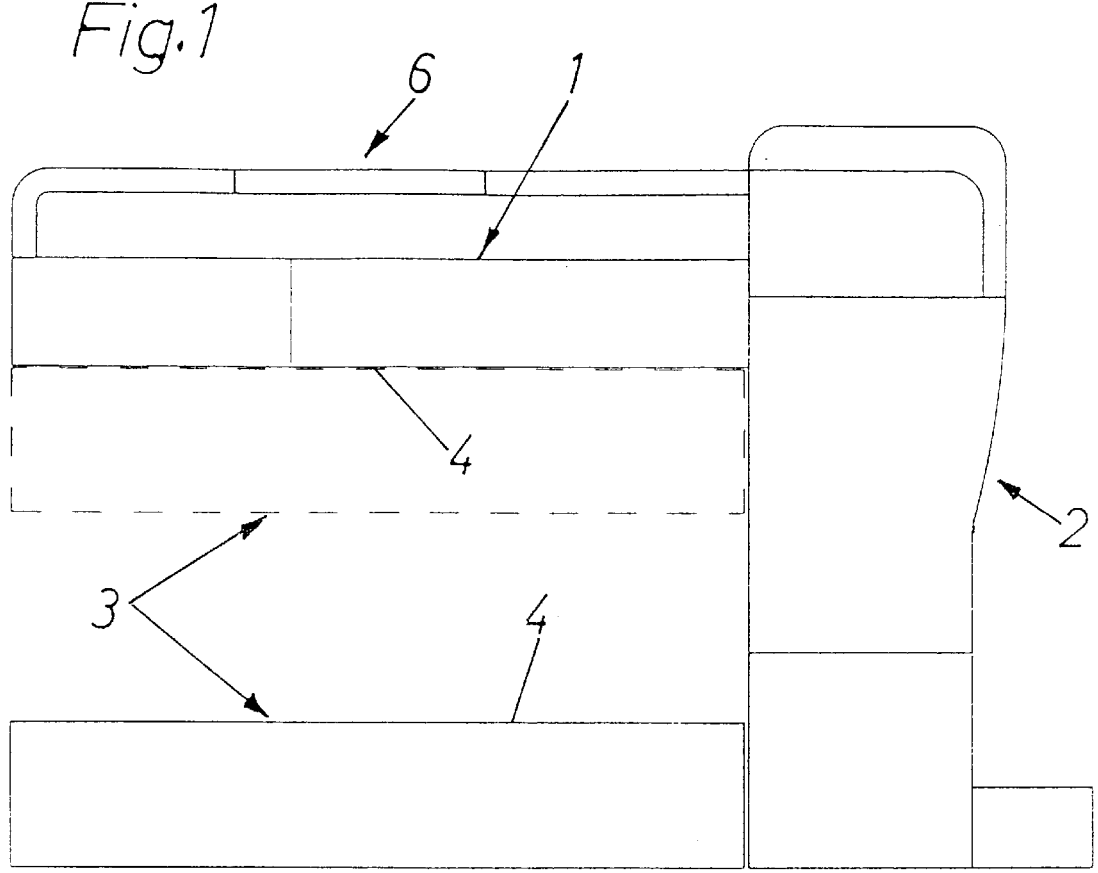
FIG. 1 is a schematic plan view of an aggregate wherein the first unit comprises two different machines and the second unit comprises a single control cabinet.
Figure 2:
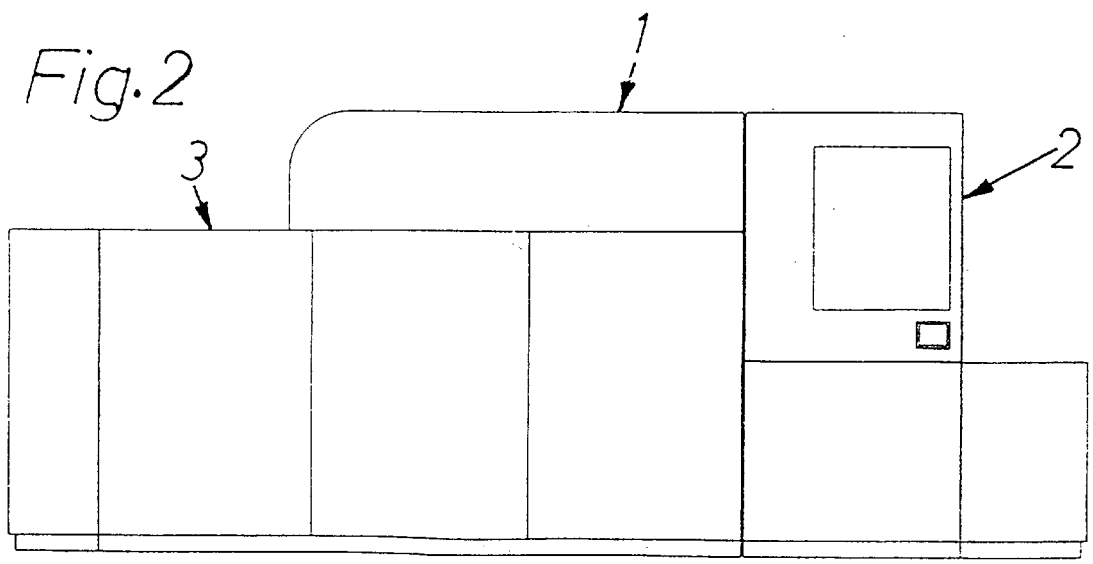
FIG. 2 is a rear elevational view of the aggregate which is shown in FIG. 1.

The aggregate which is shown in FIGS. 1 and 2 is composed of a first unit including a first machine 1 and a second machine 2. The two machines together constitute a substantially L-shaped assembly and can be installed in a production line which makes soft cigarette packets or so-called hinge lid packets and which can further process such packets, e.g., by assembling groups of ten packets into cartons and by introducing predetermined numbers of cartons into boxes of cardboard or the like. It is assumed here that the machine 1 is a so-called film wrapper (e.g., a machine known as C 90 and distributed by the assignee of the present application). The machine 2 constitutes a different packing machine such as a cigarette pack boxer or cartoner (e.g., a cigarette pack boxer known as B 90 which is distributed by the assignee of the present application).

The second unit of the aggregate which is shown in FIGS. 1 and 2 comprises a single control cabinet 3 which is a parallelepiped and is movable along a straight path between an operative or first position shown in FIG. 1 by broken lines, and a retracted position shown in FIG. 1 by solid lines. When the control cabinet 1 is in the broken-line operative position, its rear wall 4 is adjacent and prevents access to the open rear side of the frame of the first packing machine 1. At such time, the front side (the underside, as viewed in FIG. 1) of the control cabinet 3 is accessible but its rear wall 4 is immediately adjacent the open rear side of the machine 1 so that the various current-consuming and numerous other parts in the interior of the frame of the machine 1 are not accessible. However, and in order to gain access to the interior of the machine 1 by way of its rear side, it is merely necessary to shift the control cabinet 3 a short distance from the broken-line position to the solid-line position of FIG. 1, i.e., away from the open rear side of the frame of the machine 1. This entails a straight linear movement of the control cabinet 3 along the rear side of the second packing machine 2.

The frame or housing of the machine 1 can contain one, two or more electric motors, fluid-operated motors, valves, gears and/or a host of other components at least some of which consume energy and which are not accessible from the front side 6 of the machine 1.

The control cabinet 3 can contain cables and/or other conduits which connect the energy consuming components of the machine 2 and/or 1 to one or more energy sources, switches, pushbuttons, levers and/or other parts which can or should be manipulated to initiate and/or control the operation of the machine 2 and/or 1.

The rear side of the machine 2 can contain an opening which is accessible when the control cabinet 3 is shifted from the broken-line to the solid-line position of FIG. 1.

An important advantage of the aggregate including the units 1, 2 and 3 of FIGS. 1 and 2 is that its space requirements are surprisingly small even when the control cabinet 3 is shifted to the solid-line retracted position. Thus, the aggregate takes up a small amount of floor space which is very desirable in a tobacco processing plant. This is accomplished, at least in part, in that the control cabinet 3 is movable relative to the unit including the machines 1 and 2, and in that the rear wall 4 of the mobile control cabinet 3 constitutes a component which, in the operative position of the control cabinet, also serves as a rear wall for the machine 1. In other words, the machine 1 can be said to have a rear wall in the operative position of the control cabinet 3; however, such rear wall is automatically retracted, and thus affords access to the internal space of the machine 1, not later than when the mobile control cabinet 3 reaches the solid-line retracted position of FIG. 1.

Figure 3:
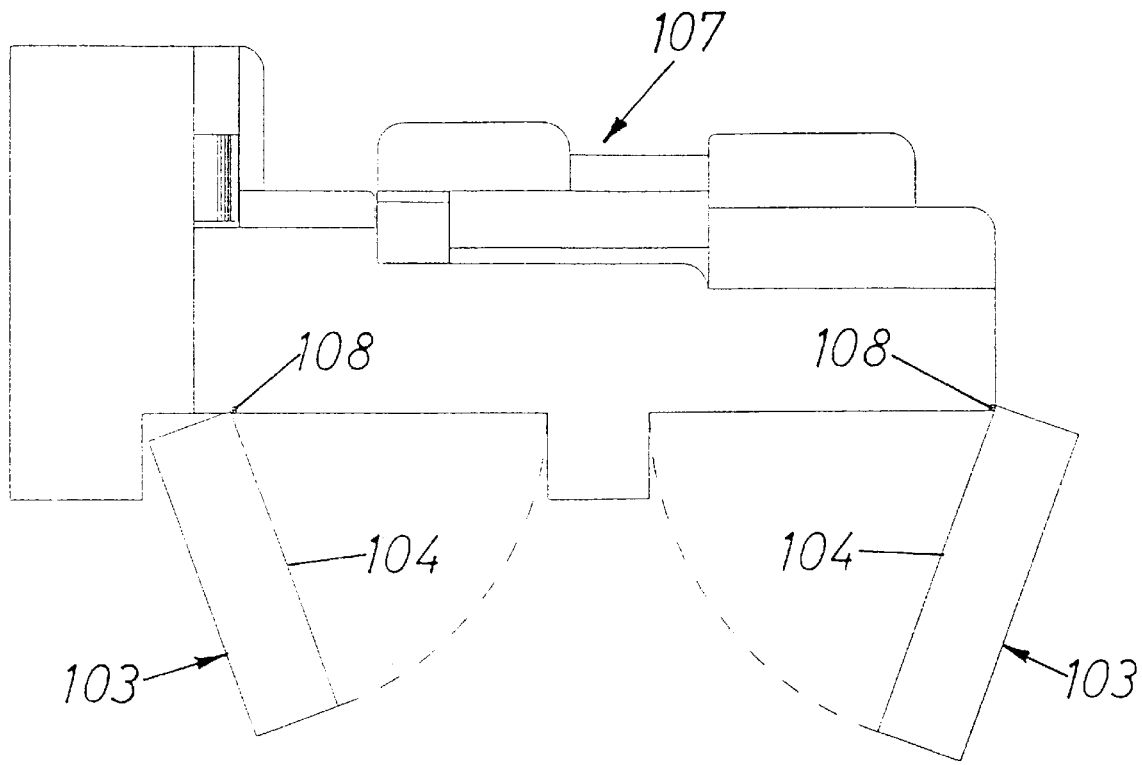
FIG. 3 is a schematic plan view of a modified aggregate wherein the second unit comprises two control cabinets which are mirror images of each other.
Figure 4:
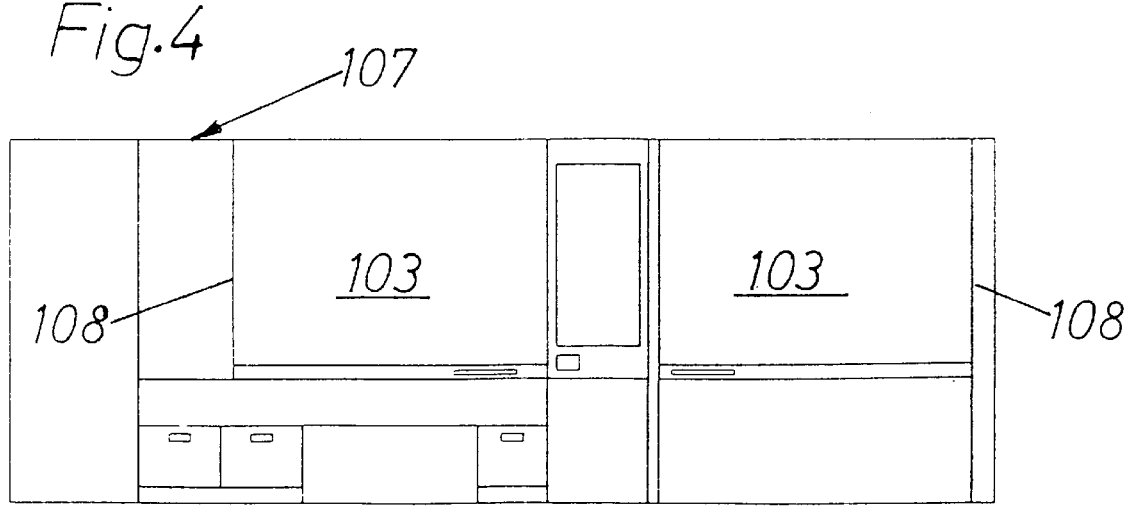
FIG. 4 is a rear elevational view of the aggregate which is shown in FIG. 3.

FIGS. 3 and 4 illustrate a second aggregate wherein the first unit includes at least one packing machine 107, such as a binge lid packing machine for plain or filter cigarettes, having a normally closed rear side adjacent two vertical hinges 108, one each for two discrete control cabinets 103. FIG. 3 shows the control cabinets 103 in their retracted positions in which their rear walls 104 are spaced apart from the respective open portions of the rear side of the machine 107. The two control cabinets 103 are but need not be mirror images of each other; for example, one of the control cabinets 103 can be articulately connected to the frame of the machine 107 in such a way that it must be pivoted in the same direction as the other control cabinet if such components of the second unit are to jointly return to their operative positions in which the rear walls 104 close or seal the adjacent portions of the rear side of the machine 107.

The non-referenced structure shown in the left-hand portions of FIGS. 3 and 4 can constitute a machine which, together with the machine 107, constitutes the first unit of the aggregate which further includes a second unit composed of the control cabinets 103.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art and, therefore, such adaptations should and are intended to be comprehended within the meaning and range of equivalence of the appended claims.

What is claimed is:

1. An aggregate comprising
   a first unit including at least one energy-consuming machine having at least one internal space; and
   a second unit including at least one control cabinet having means for supplying energy to and for regulating the operation of said at least one machine,
   said at least one control cabinet having a first position and a second position, and being movable relative to said at least one machine,
   wherein in the first position, said at least one control cabinet comprises a wall for said at least one machine, and
   wherein in the second position, said control cabinet is at least partially separated from said at least one internal space of said at least one machine.

2. The aggregate of claim 1, wherein said at least one machine is a packing machine.

3. The aggregate of claim 1, wherein said at least one machine is a packing machine for rod-shaped products of the tobacco processing industry.

4. The aggregate of claim 1, wherein said wall is part of said at least one control cabinet.

5. The aggregate of claim 1, wherein said at least one control cabinet comprises a rear portion including said wall.

6. The aggregate of claim 1, wherein said wall is connected with and shares the movements of said at least one control cabinet.

7. The aggregate of claim 1, wherein said at least one control cabinet is reciprocable relative to said at least one machine.

8. The aggregate of claim 1, wherein said at least one control cabinet is pivotable with reference to said at least one machine.

9. The aggregate of claim 8, wherein said at least one control cabinet is pivotable with reference to said at least one machine about a substantially vertical axis.

10. The aggregate of claim 1, wherein said at least one machine has a front side and a rear side and said second unit includes a plurality of control cabinets at said rear side of said at least one machine.

11. The aggregate of claim 10, wherein said control cabinets include two cabinets which are substantially mirror images of each other.

12. The aggregate of claim 1, wherein one of said units is substantially L-shaped.

13. The aggregate of claim 1, wherein one of said units is a parallelepipedon.

* * * * *